No. 787,761. PATENTED APR. 18, 1905.
W. A. & H. S. HOLLIS.
INNER TUBE AND MEANS FOR INFLATING SAME.
APPLICATION FILED JULY 12, 1904.
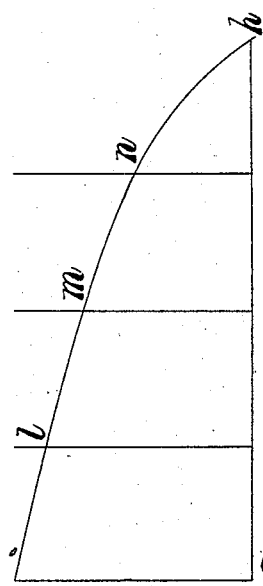
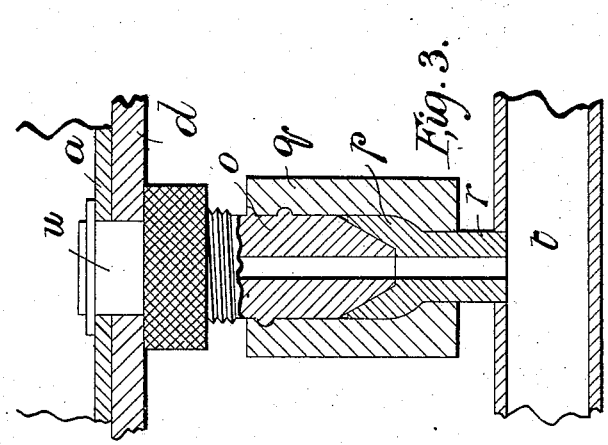
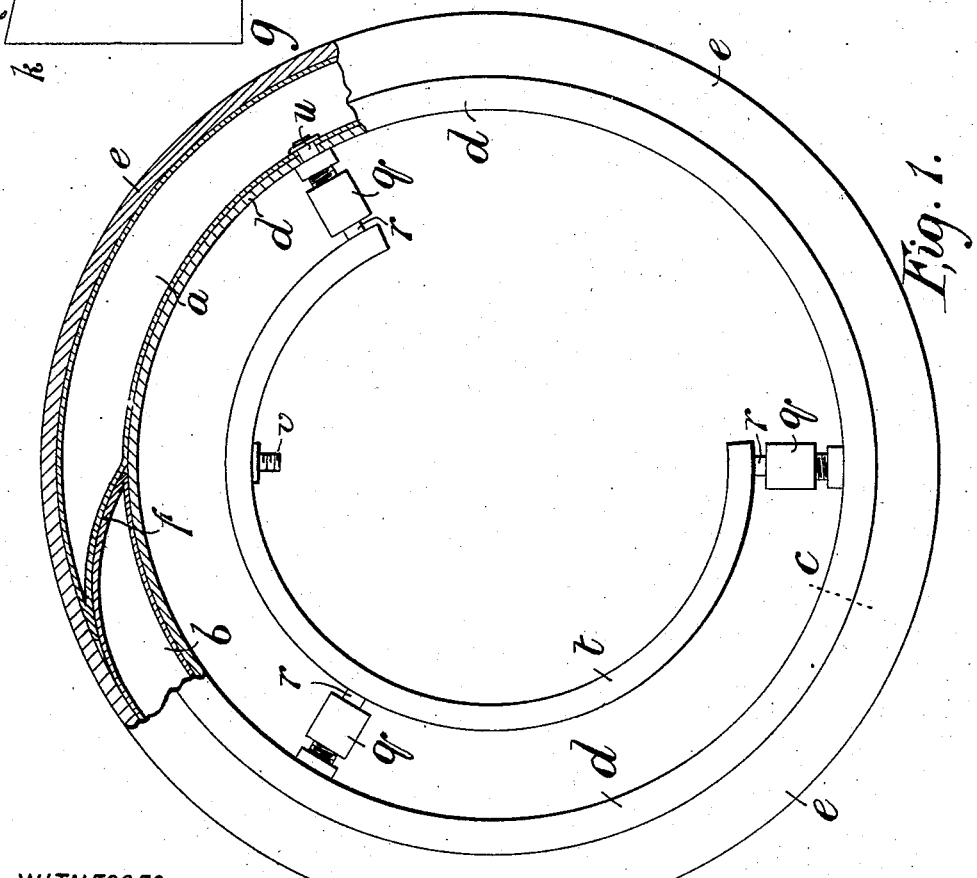
WITNESSES:
A. E. Davis
William P. Loebes.
INVENTORS:
William Ainslie Hollis
Herbert Stanley Hollis
BY
ATTORNEYS.

No. 787,761. Patented April 18, 1905.

UNITED STATES PATENT OFFICE.

WILLIAM AINSLIE HOLLIS AND HERBERT STANLEY HOLLIS, OF HOVE, ENGLAND.

INNER TUBE AND MEANS FOR INFLATING SAME.

SPECIFICATION forming part of Letters Patent No. 787,761, dated April 18, 1905.

Application filed July 12, 1904. Serial No. 216,219.

*To all whom it may concern:*

Be it known that we, WILLIAM AINSLIE HOLLIS and HERBERT STANLEY HOLLIS, subjects of the King of Great Britain and Ireland, residing at 1 Palmeira avenue, Hove, in the county of Sussex, England, have invented certain new and useful Improvements in or Relating to Inner Tubes and Means for Inflating the Same, of which the following is a specification.

This invention relates to inner tubes for pneumatic tires and to means for inflating the same.

The invention consists in the construction and arrangement of two or more inner air-tubes so that they lie around the rim of the wheel without shifting their relative positions and without bursting when the tire is inflated.

The invention further consists in means for inflating the tubes simultaneously.

Referring to the accompanying drawings, Figure 1 is an elevation, partly in section, showing our improved inner tube in position on a rim. Fig. 2 shows the curve suitable for the overlap. Fig. 3 is a sectional view of one of the inflating-valves.

In the inner tube (shown in Fig. 1) three sections of tubes $a\ b\ c$ capable of inflation with compressed air are arranged in the rim $d$ with their ends overlapping and are covered with an outer cover $e$ in any suitable manner. The transverse sectional area of the tubes is the same along their whole length, except at the parts where two ends of tube overlap. At these parts the sum of the transverse sectional areas of the tubes in a radial plane of the wheel is equal to or slightly greater than the transverse sectional area of the part of the tube where there is no overlapping. We have found a length of overlap of four inches very suitable; but in no case should the overlap be less than three inches. The tubes are composed of rubber or other suitable material; but if rubber is used the walls of the tube are thickened at the ends of each section, as shown at $f$, Fig. 1, the thickness at the ends being at least one-third greater than at other parts of the tube. The curve $k\ l\ m\ n\ h$, Fig. 2, we have found a suitable form for the ends when the length of overlap is four inches. In this figure $g\ h$ represents the length of overlap and $g\ k$ the diameter of the tube. To construct the curve suitable for an overlap of length other than four inches, we draw a base-line of the length of the overlap and divide it into four equal parts. Ordinates drawn through the points of division equal to the ordinates through the points $l\ m\ n$ of the curve (shown in Fig. 2) will give the required curve.

In the form of our invention described and illustrated in the drawings we have shown the plane of contact of two sections of tube parallel to the axis; but we may have the plane of contact turned through an angle from this position, if desired.

In each section of the tube we form a hole at which we attach a valve, which projects through the rim of the wheel when the tube is placed thereon. The valve $u$ may be any one of those at present in use, but with the inflating-nipple $o$ modified as follows: In Fig. 3, $o$ represents the nipple of the modified valve, which engages by a screw with a screw-thread formed inside the mouth of the collar $q$ of such form that it can be fixed in position by a single turn. Into the top of the collar $q$ fits the end of the tube $r$, which is in the form of a hemisphere $p$. The tube $r$ is joined to the connecting-tube $t$, to any suitable part of which an inflating-nipple $v$ of any suitable kind is attached. For light vehicles the connecting-tube $t$ may be made of rubber or other flexible material and may be readily detached when the tires are not being inflated. For other vehicles the connecting-tube may be made of metal and left in position. This arrangement will enable all the sections of the inner tube to be inflated simultaneously and will insure the pressure of air in all of them being the same after inflation.

Having now described our invention, what we claim as new, and desire to secure by Letters Patent, is—

1. An inner tube for a pnuematic tire, consisting of two or more sections of rubber tubing tapered and overlapping at their ends for a considerable distance, said sections having thickened curved walls at their ends, as set forth.

2. An inner tube for a pneumatic tire, comprising in combination, two or more sections of tubing, valves attached to the several sections of said tubing, screw-threads on the nipples of said valves, screw-threaded collars adapted to be attached to said nipples by a single turn, tubes held to said nipples by said collars, a connecting-tube attached to said tubes, and a connection adapted for supplying air to said connecting-tube, as set forth.

3. An inner tube for a pneumatic tire, comprising in combination, two or more sections of tubing, said sections being tapered and overlapping at their ends, valves attached to the several sections of said tubing, screw-threads on the nipples of said valves, screw-threaded collars adapted to be attached to said nipples by a single turn, tubes held to the nipples by said collars, a connecting-tube attached to said tubes, and a connection adapted for supplying air to said connecting-tube, as set forth.

4. An inner tube for a pneumatic tire, comprising in combination, two or more sections of rubber tubing tapered and overlapping at their ends, said sections being closed by thickened rubber at their overlapping ends, valves attached to the several sections of said tubing, screw-threads on the nipples of said valves, screw-threaded collars adapted to be attached to said nipples by a single turn, tubes held to the nipples by said collars, a connecting-tube attached to said tubes, and a connection adapted for supplying air to said connecting-tube, as set forth.

5. An inner tube for a pneumatic tire, comprising in combination, two or more sections of rubber tubing tapered and overlapping at their ends, said sections being closed by thickened rubber at their overlapping ends, valves attached to the several sections of said tubing, screw-threads on the nipples of said valves, screw-threaded collars adapted to be attached to said nipples by a single turn, tubes held to the nipples by said collars, a connecting-tube attached to said tubes, and an inflating-nipple attached to said connecting-tube, as set forth.

In witness whereof we have hereunto set our hands in presence of two witnesses.

WILLIAM AINSLIE HOLLIS.
HERBERT STANLEY HOLLIS.

Witnesses:
CAVENAGH M. GAUL,
H. PEWRY POWEL.